United States Patent Office 2,781,452
Patented Feb. 12, 1957

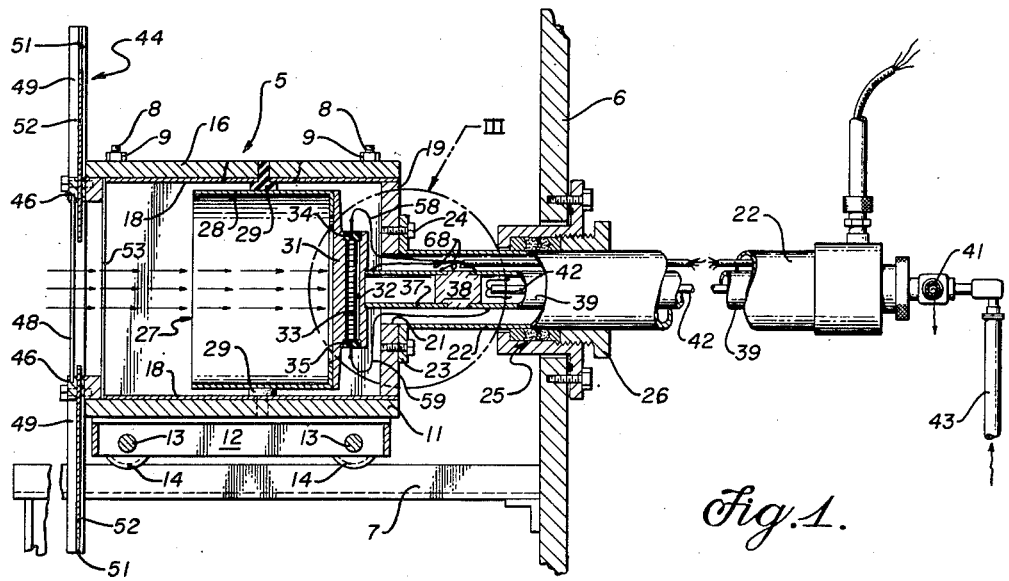
Fig. 1.
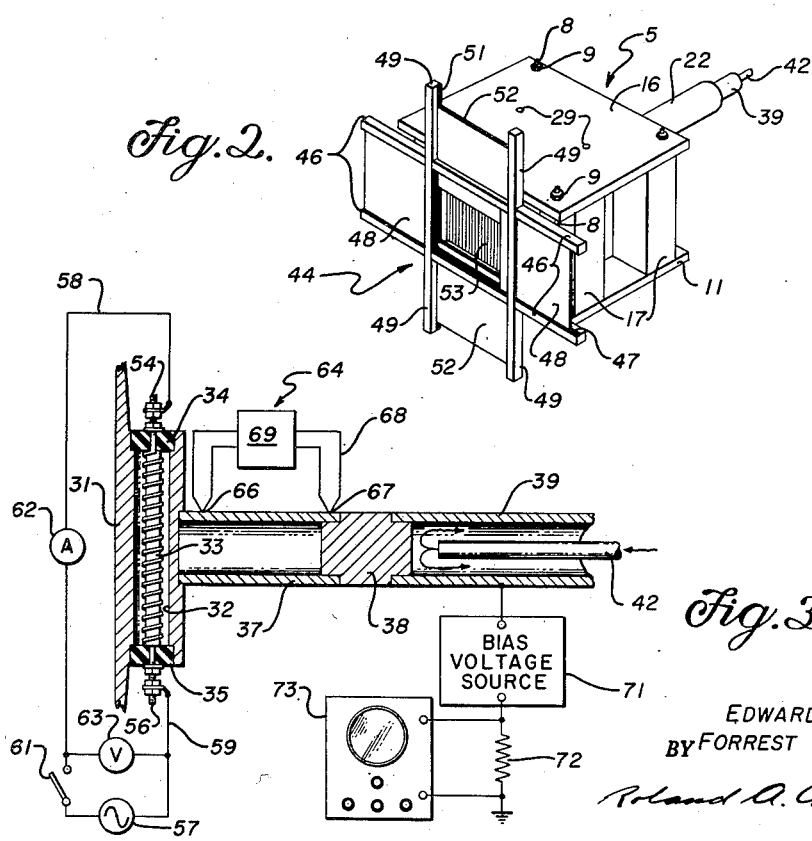
Fig. 2.
Fig. 3.
INVENTORS.
EDWARD J. LOFGREN
BY FORREST FAIRBROTHER Jr.
ATTORNEY.

2,781,452

ION BEAM RECEIVER

Edward J. Lofgren, Berkeley, and Forrest Fairbrother, Jr., Livermore, Calif., assignors to the United States of America as represented by the United States Atomic Energy Commission Application July 22, 1955, Serial No. 527,891

16 Claims. (Cl. 250—41.9)

This invention relates to nuclear particle accelerators and more particularly to the probes employed for ascertaining the electrical characteristics of the beam produced in such accelerators.

In the use of such probes which are so disposed as to intercept the beam, various difficulties have attended the attempt to obtain precise measurement of beam characteristics. In the customary arrangement the probe is connected to ground through a galvanometer or other current metering device. The effect of secondary charge upon the probe during the measurement is such as to give an indication varying materially from true beam current. The secondary charge referred to is the charge induced upon the probe by the action of the intercepted beam on the probe.

Assuming, for example, a positively charged beam, it will be seen that when a grounded probe is disposed in the path of the beam, the current reading of the series connected galvanometer will include that produced by the emission of negative, secondary charges from the probe as well as current produced by the impact of the positive beam upon the probe. In addition, negative charges arriving at the probe or positive charges leaving the probe will also cause the galvanometer reading to differ from the true value of the positive beam current. From the foregoing considerations, the necessity of calibrating the galvanometer with regard to the charge characteristics of the beam and its intercepting probe will be clear.

In practice, the calibration referred to has been a time-consuming and involved procedure since it required an independent measurement of the beam with other apparatus in order to obtain data from which a correction factor for the galvanometer could be determined.

It is a principal object of the present invention to enable the absolute value of a particle accelerator beam to be quickly and accurately ascertained.

A further object of the invention is to provide means for measuring the electrical current value of an accelerated particle beam independently of usual current influencing factors such as secondary charge upon the probe.

An additional object of the invention is to provide in a current measuring probe for an intense beam, alternate means for measuring beam current, one of the means being absolute and thus capable of calibrating the other and serving also to periodically check the accuracy of the other whenever considered desirable.

Other objects and advantages of the invention will be apparent from a consideration of the following specification and accompanying drawings in which like numerals refer to like parts throughout the several different views.

In the drawing,

Figure 1 is a cross-sectional view of a preferred embodiment of the invention showing the same disposed within the vacuum chamber of a nuclear particle accelerator;

Figure 2 is a perspective view of the major portion of this embodiment; and

Figure 3 is an enlarged fragmentary view of that portion of the embodiment enclosed by circle III in Fig. 1 and showing, in addition, a schematic diagram of the connections to the electrical components of the device.

The means preferably employed for carrying out the objects of the invention include a calibrating measurement means which is associated with the collector cup type of probe. The latter means utilizes an electrical heating element which is secured in heat transmitting relation to the collector cup and is provided with a variable and measured power source. A thermocouple is provided to register the temperature of the collector cup. Prior to the exposure of the probe to a beam, the heating element is energized to heat the collector through a range of temperatures likely to be encountered in the operation of the probe, and the power input needed to maintain the collector at these temperatures is noted. The power values thus obtained are plotted to provide data from which the power input required to maintain the collector at any temperature within the range is known.

To determine an absolute value for beam current, the beam is caused to impinge upon the collector cup for an interval sufficient to establish a steady temperature state wherein suitable cooling means, as in the operation described above, removes heat as rapidly as it is generated by the impact of the beam. It can be seen that under this condition, the temperature as registered by the thermocouple is a measure of the power input to the collector by the beam. For a beam of known accelerating potential the value of the beam current can then be calculated by the familiar electrical laws involving the relation of voltage, current and power.

Reference is now made to the drawing and to Fig. 1 thereof wherein there is shown a probe assembly generally indicated at 5 which is mounted for longitudinal movement toward and away from wall 6 of an accelerator vacuum chamber through the provision of a pair of parallel rails 7 suitably fixed within said chamber. Probe assembly 5 includes an outer housing structure comprised of several wall elements united to form a rigid unit by suitable means such as elongated through bolts 8 provided with retainer nuts 9. Such wall elements include a lower, rectangular magnet yoke plate 11, to a pair of the opposite margins of which angles 12 are secured, the latter accommodating a pair of spaced axles 13 carrying wheels 14 for movement along rails 7; an upper yoke plate 16 vertically spaced from plate 11 is suitably apertured adjacent its four corners, as is plate 11, to receive the bolts 8 which maintain four elongated magnets 17 (see Fig. 2) of rectangular cross section normal to plates 11 and 16 in their positions adjacent bolts 8 but within the margins of said plates, the latter being of increased thickness between oppositely disposed pairs of bolts 8 in order to increase the effectiveness of magnets 17 in establishing a magnet field normal to plates 11 and 16. A hollow, conducting but non-magnetic liner 18 rectangular in cross section and of suitable sheet-like material, as copper for example, is closely nested between lower plate 11 and upper plate 16 and between the oppositely disposed pairs of magnets 17 as will appear from Figs. 1 and 2.

The open end of the outer housing structure formed by plates 11 and 16 and magnets 17 and directed toward the wall 6, as well as the open end of liner 18, is closed by a magnetic end plate 19 which is centrally apertured at 21 for a purpose now to be described. A hollow, probe handling cylinder 22 having a flanged end portion 23 which is peripherally apertured is secured to plate 19 in alignment with aperture 21 by means such as bolts 24 extending through said peripheral apertures and into similar but threaded apertures in plate 19. It will be observed that since cylinder 22 extends from within the accelerator vacuum chamber to the exterior thereof, means has been provided whereby the probe assembly 5 may be adjusted axially of the beam to various positions.

To enable the foregoing adjustment to be accomplished without impairing the vacuum within the chamber of wall 6, cylinder 22 is of such length as to extend through an aperture in the wall and passes through a suitable seal therein, such as chevron seal 25 seated in annular retainer 26 as is well known in the art.

For a consideration of the probe structure proper and particularly its arrangement as exemplifying the present invention, reference is again made to Fig. 1 wherein there is disposed within and axially of liner 18 a collector cup 27 comprised of a hollow, rectangular cylinder 28 having its oppositely disposed walls parallel and spaced from yoke plates 11 and 16 and magnets 17, respectively. Such spaced position is conveniently determined by insulated spacer blocks 29 seated in appropriate recesses in liner 18, yoke plates 11 and 16 and centrally of the respective walls of rectangular cylinder 28. A rectangular beam collector plate 31 secured as a closure to the end of cylinder 28 nearest wall 6 is of such overall thickness as to provide a recess 32 therein for a suitable resistance type heating element 33. Insulated blocks 34, 35 seated in the top and bottom, respectively, of recess 32 serve as supporting means for element 33.

Collector cup 27 and its unitary closure plate 31 are further supported by a short length of tubular conductor 37 fixed to the central portion of plate 31 and extending axially of cylinder 22. A solid, cylindrical closure plug 38 of stepped diameter serves as a rigid and water-tight interconnection between conductor 37 and a similar, aligned tubular conductor 39 having remote connection as at 41 for discharge of cooling water, for example, directed against the plug body by a central, tubular member 42 suitably supported within conductor 39 and having remote connection to a source 43.

To provide means for controlling the effective beam entrance aperture of the probe, a shutter assembly 44 is mounted on the open face of the apparatus opposite the closure plate 31. The shutter assembly 44 comprises two horizontal guide members 46 disposed across the forward end of the housing structure formed by plates 11 and 16 and magnets 17, the members being mounted one above and one below the opening in the end of the housing. The guide members 46 have elongated slots 47 in their adjacent faces such that the margins of two rectangular shutters 48 may be slidably disposed therein. The shutters 48 are thus mounted between the guide members 46 and adapted to slide transversely across the open end of the probe assembly. To complete the beam aperture control means a set of vertical guide members 49 are disposed on either side of the open end of the probe assembly. The vertical guide members 49 are provided with slots 51 which are offset from the plane of slots 47 such that a set of vertical shutters 52 may be slidably mounted therein.

To provide for the suppression of secondary charge which might otherwise be emitted from the collector cup 28, a rectangular grid composed of closely spaced vertical wires 53 is disposed across the beam aperture behind the shutter assembly 44. The grid wires 53 are grounded to the body of the probe and function in a manner to be hereinafter described.

Having described the principal structure of the invention, attention will now be given to the electrical components thereof and their utilization in accomplishing the invention objectives.

Referring therefore to Fig. 3, there is shown means energizing the resistance heating element 33. Terminals 54 and 56 are mounted on insulated blocks 34 and 35, respectively, and connect with the upper and lower extremity of the heating element 33. The terminals 54 and 56 are connected to a suitable power source 57 by leads 58 and 59, respectively, a switch 61 being disposed in the circuit for control purposes. The power source 57 may be either D. C. or A. C. and in the present instance is standard 110 volt, 60 cycle, alternating current. To provide an accurate measure of the power input to the heating element 33 a current measurement device 62 is disposed in series therewith and a voltage measurement device 63 is connected in parallel with the element. It will be appreciated that the current and voltage meters 62 and 63 may, if desired, be a single integral device of the class commonly known as wattmeters.

To measure the thermal gradient along the tubular conductor 37, in order to obtain an independent reading indicative of the power input to the probe assembly, a thermocouple element 64 is provided. The thermocouple element 64 comprises a first junction 66 of two dissimilar metallic conductors, such as iron and iron-constantan, in contact with the tubular conductor 37. A second similar junction 67 contacts the tubular conductor 37 at a point more removed from the beam collector plate 31. If like metals in each of the junctions 66 and 67 are connected by suitable conductors 68 and a thermal differential exists between the two junctions, an electric potential will exist between the two conductors. The thermoelectrically induced potential, which effect is well understood within the art, may be read upon a galvanometric device 69 connected between the two junctions. As may be seen, the reading of the galvanometric device 69 will be proportional to the thermal power input to the beam collector plate 31, which information will be utilized in a manner to be hereinafter described.

The tubular conductor 39 is connected with one terminal of a high voltage supply 71 thus providing a potential to the collector cup 27 with respect to the grid structure 53. The potential thus placed upon the collector cup 27 should be of sufficient magnitude, in this embodiment 500 volts, that a maximum of secondary electrons will be confined to the probe. The remaining terminal of the voltage supply 71 is connected to ground through a voltage dropping resistor 72.

As may be seen, the charge accumulated on the collector cup 27 is shunted to ground through the potential supply 71 and resistor 72. Thus the normal ion beam current can be determined by dividing the voltage drop across the resistor 72 by the value of the resistance thereof. To effect such a measurement, an oscilloscope 73 is connected across the resistor 72 and adapted to indicate the voltage thereacross.

As has been previously stated, the beam current determined by measurement of the current passing through the resistor 72 may not precisely correspond to the ion beam current. The discrepancy is principally derived from the emission of secondary particles from the probe structure and from the arrival of charge of the reverse sign at the probe. To obtain an accurate value of beam current from the reading of the oscilloscope 73, it is necessary to compensate for the effects introduced from the above causes.

To compensate for the secondary charge effects, an absolute calorimetric measurement of the beam current is made and the oscilloscope reading adjusted to conform therewith. To perform the calorimetric beam current measurement, the beam is caused to impinge upon the collector cup 27 for an interval sufficient to establish a steady temperature state. The energy content of the beam is thus converted into heat which is carried away by the coolant circulating within the tubular conductor 39. In this manner a thermal gradient is set up along the tubular conductor 37 and a reading proportional to the thermal gradient registers on the thermocouple galvanometer 69.

If the absolute power input to the probe assembly from the ion beam, as represented by a given reading of the thermocouple galvanometer 69, is ascertained, then beam current may be computed since beam voltage is easily obtainable and the well-known power current and voltage relationship holds for the system. It will be appreciated that the present discussion postulates steady D. C. conditions and that pulsed beam operation will be taken up hereinafter. Thus for a simplified D. C. system:

$$I = \frac{U}{E}$$

where $I$ = beam current
$U$ = power delivered to probe
$E$ = beam accelerating potential In the above formula, E the beam accelerating potential is readily available in that virtually all ion accelerators deliver a beam of known energy. It will now be shown how U, the beam energy delivered to the probe per unit time, may be ascertained from the reading of the thermocouple galvanometer 69.

If in the absence of an ion beam, the power supply 47 is caused to deliver energy to the heating element 32, the system is analogous to the delivery of energy to the probe by the ion beam. The power input needed to maintain any given reading of the thermocouple galvanometer may be ascertained by multiplying the readings of the current and voltage meters 62 and 63. Thus if the power supply 57 is adjusted until the galvanometer 69 gives a reading similar to the reading in the presence of an ion beam, the power input to the probe is the same in each instance and the product of the readings of the current and voltage meters 62 and 63 may be used in the above equation to determine the ion beam current. The beam current value thus obtained from the calorimetric method is absolute and may be used to determine a correction factor for the current readings taken directly from the oscilloscope 73.

To facilitate use of the supplementary calorimetric measurement, it is desirable to operate the power supply 47 through a range of values and obtain a curve of the readings of the thermocouple galvanometer 69 plotted against power input to the probe. Henceforth the calorimetric value for ion beam current may be determined by noting the reading of the thermocouple galvanometer, consulting the curve to determine what power input is represented, and making the necessary computation.

It is desirable now to consider how the stated equation is affected by use of the probe with a pulsed or time varying ion beam. Calorimetric determination, under such conditions, depends upon evaluation of the integral:

$$U = \int_0^t e(t) i(t) dt$$

therefore:

$$I_{ave} = \frac{1}{t} \int_0^t i(t) dt = \frac{U}{\int_0^t e(t) dt}$$

where:

$U$ = energy delivered to probe in time $t$ (joules)
$t$ = time duration of pulse (seconds)
$e(t)$ = beam accelerating voltage as a function of time (volts)
$i(t)$ = beam current as a function of time (amperes)
$i_{ave}$ = average beam current over time $t$ (amperes)

For a given ion beam induced reading of the thermocouple galvanometer 69, it will be found:

$$U = EIT$$

where:

$E$ = A. C. voltage applied to heater element to produce a like thermocouple galvanometer reading, $I$ = A. C. current applied to the probe to produce the like reading, and
$T$ = the period between successive beam pulses.

Therefore, combining the two above equations:

$$I_{ave} = \frac{EIT}{\int_0^t e(t) dt}$$

In the last given equation, the quantities E and I may be determined from meters 63 and 62, respectively. The quantities T, $e(t)$, and $t$ are best determined by monitoring the supply voltage of the source of the ion beam by one of various techniques which will be apparent to those skilled in the art. For example, the acceleration of ion beams is frequently achieved by passing the ions through an electric field which is established between two or more electrodes. The magnitude of the field, and thus $e(t)$, the accelerating voltage of the ions, may be determined by connecting an oscilloscope between the electrodes and observing the voltage trace. The quantity $t$ is determined by measuring the length of the trace, and T is measured by timing the interval between successive traces. Alternately the quantities $t$ and T may be taken directly from the probe oscilloscope 73 since secondary charge distortion in these readings will be found to be negligible.

While, through the above procedure, the effects of secondary charge are corrected, it is none the less desirable to reduce such effects to a minimum. Means herein described for accomplishing such reduction include the magnets 17 and grid structure 53. As may be seen, charged particles attempting to leave the collector cup 27 will describe an arcuate trajectory in the field of the magnets and be returned to the cup. Reinforcing this effect is the potential difference between the cup 27 and grid structure 53 which potential difference is established by source 71.

While the invention has been described with respect to a single preferred embodiment, it will be apparent to those skilled in the art that numerous variations and modifications may be made within the spirit and scope of the invention and thus it is not intended to limit the invention except as defined in the following claims.

What is claimed is:

1. In a device for studying the characteristics of a charged particle beam, the combination comprising a beam collecting element, means delivering thermal energy to a first portion of said beam collecting element, means removing thermal energy from a second portion of said beam collecting element, and thermometric means responsive to the temperature of a selected area of said collecting element.

2. In a probe for measuring the characteristics of a charged particle beam, the combination comprising a conducting beam collecting electrode, means supplying measured thermal energy to said collecting electrode, means withdrawing thermal energy from said collecting electrode, and a meter responsive to the temperature of a selected portion of said beam collecting electrode.

3. In apparatus for measuring the magnitude of a charged particle beam, the combination comprising a beam collecting conductor having provision for the discharge of charge, a controllable heating element supplying thermal energy to said beam collecting conductor, means removing thermal energy from said beam collecting conductor, and thermometric means responsive to temperature within a selected region of said beam collecting conductor.

4. In a probe for measuring the magnitude of a beam of charged particles, the combination comprising a charge collecting electrode disposed to intercept said charged particle beam, said charge collecting electrode having provision for the discharge of charge acquired from said beam, an electrical heating element supplying thermal energy to said charge collecting electrode at a known and controllable rate, means withdrawing thermal energy from said charge collecting electrode, and a temperature indicator means responsive to the temperature of a selected portion of said charge collecting electrode.

5. A probe as described in claim 4 wherein said means withdrawing thermal energy from said charge collecting electrode comprises a conduit means directing fluid coolant against a portion of said electrode.

6. In an ion beam receiver, the combination comprising an ion beam collecting electrode having a conducting path to ground, a heating element supplying measured thermal energy to a first portion of said collecting electrode, a coolant device withdrawing thermal energy from a second portion of said collecting electrode, temperature indicating means responsive to a third portion of said collecting electrode, and a current measurement means responsive to current in said conducting path.

7. An ion beam receiver as described in claim 6 further characterized by magnet means providing a magnetic field in the vicinity of said ion beam collecting electrode.

8. An ion beam receiver as described in claim 6 having a grid structure disposed adjacent said beam collecting electrode in the path of said ion beam, and a bias source supplying a potential difference between said grid structure and said beam collecting electrode.

9. An ion beam receiver as described in claim 6 further characterized by shutter means controllably occluding said ion beam collecting electrode.

10. An ion beam receiver as described in claim 6 wherein said temperature indicating means comprises a thermoelectric element having junctions of dissimilar conductors disposed at spaced points on said ion beam collecting electrode and galvanometric means responsive to the potential induced within said thermoelectric element by the thermal gradient along said ion beam collecting electrode.

11. In a high energy ion beam receiver, the combination comprising a charge receiver cup positionable in the path of said beam, said cup being provided with a conducting extension, an electrical resistance heating element substantially buried within a wall of said charge receiver cup, a variable power supply providing measured power to said heating element, means circulating coolant about a portion of said conducting extension, and a thermoelectrically actuated meter responsive to the thermal gradient along a segment of said conducting extension, said segment being situated between said heating element and the coolant contacted portion of said conducting extension.

12. A high energy ion beam receiver as described in claim 11 further characterized by the provision of conductor means for discharging said charge receiver cup to ground and metering means sensitive to current through said conductor means.

13. In a probe structure for measuring the magnitude of an ion beam, the combination comprising a hollow conducting beam collecting cup having an open forward end adapted to receive said ion beam, said cup having a cylindrical wall section and a beam collecting plate closing the rear extremity thereof, said cup being further characterized by an elongated thermal conductor projecting from one surface thereof, an electrical resistance heating element substantially buried within said beam collecting plate, measured power source means supplying said heating element, means circulating fluid coolant about a portion of said thermal conductor, thermoelectric indicator means responsive to the thermal gradient along a segment of said thermal conductor, said segment lying between said beam collecting plate and the fluid coolant contacted portion of said thermal conductor, electrical conductor means discharging said collecting cup of charge acquired from said ion beam, and means measuring the magnitude of current through said electrical conductor.

14. A probe structure as described in claim 13 further characterized by a grid structure disposed transverse to the axis of said cup and spaced from the open end thereof and voltage supply means applying a potential difference between said grid structure and said cup.

15. A probe structure as described in claim 13 further characterized by magnet means disposed adjacent said cup and establishing a magnetic field transverse to the axis of said cup.

16. A probe structure as described in claim 13 further characterized by a shutter structure comprised of a plurality of flat shutters disposed proximal to the open end of said cup, said flat shutters being movable in a plane transverse to the axis of said cup.

References Cited in the file of this patent
UNITED STATES PATENTS 2,486,452    Washburn et al. _____ Nov. 1, 1949